US008396786B2

(12) United States Patent
Chiulli et al.

(10) Patent No.: US 8,396,786 B2
(45) Date of Patent: *Mar. 12, 2013

(54) SYSTEM AND METHOD FOR EXCHANGING INSTITUTIONAL RESEARCH AND TRADE ORDER EXECUTION SERVICES

(75) Inventors: Allan T. Chiulli, Highlands Ranch, CO (US); Tom H. Warren, Greenwood Village, CO (US)

(73) Assignee: UAT, Inc., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/292,500

(22) Filed: Nov. 9, 2011

(65) Prior Publication Data
US 2012/0059747 A1 Mar. 8, 2012

Related U.S. Application Data (63) Continuation of application No. 12/043,687, filed on Mar. 6, 2008, now Pat. No. 8,078,522.

(60) Provisional application No. 60/905,812, filed on Mar. 9, 2007.

(51) Int. Cl.
*G06Q 40/00* (2006.01)

(52) U.S. Cl. ............................ 705/37; 705/35; 705/36 R (58) Field of Classification Search .................... 705/37, 705/35, 36
See application file for complete search history.

(56) References Cited

U.S. PATENT DOCUMENTS

| | | | |
|---|---|---|---|
| 5,502,637 A | 3/1996 | Beaulieu et al. | |
| 5,819,271 A * | 10/1998 | Mahoney et al. | ..................... 1/1 |
| 5,864,871 A | 1/1999 | Kitain et al. | |
| 6,009,412 A | 12/1999 | Storey | |
| 6,510,419 B1 | 1/2003 | Gatto | |
| 6,651,056 B2 * | 11/2003 | Price et al. | ..................... 707/727 |
| 6,681,211 B1 | 1/2004 | Gatto | |
| 6,983,257 B2 | 1/2006 | Gatto | |
| 7,752,103 B2 * | 7/2010 | Hurewitz | ..................... 705/35 |
| 2002/0128958 A1 | 9/2002 | Slone | |
| 2003/0046209 A1 * | 3/2003 | Brandenberger et al. | ........ 705/36 |
| 2003/0225666 A1 * | 12/2003 | Murtaugh et al. | .............. 705/36 |
| 2005/0102219 A1 * | 5/2005 | Taylor et al. | ..................... 705/37 |
| 2005/0216323 A1 * | 9/2005 | Weild | ............................... 705/7 |
| 2005/0246264 A1 * | 11/2005 | Plunkett | ........................ 705/37 |
| 2006/0041456 A1 * | 2/2006 | Hurewitz | ........................ 705/7 |
| 2006/0161472 A1 | 7/2006 | Weild | |

OTHER PUBLICATIONS

Gerald, T. L. (1998). 'Soft dollars' and other brokerage arrangements. Journal of Financial Planning, 11(1), 89-92. Retrieved Oct. 25, 2012.*
Schmerken, I. (2005). Broker research: What's it worth? Wall Street & Technology, 30-38. Retrieved Oct. 25, 2012.*
Anthony Guerra, (Oct. 2005), Follow the Leader, Wall Street & Technology, 23-24, 26, Retrieved Aug. 11, 2011.
Ivy Schmerken, (May 2005), Broker Research: What's It Worth? Wall Street & Technology, 30-38, Retrieved Aug. 11, 2011.

* cited by examiner

*Primary Examiner* — Kito R Robinson
(74) *Attorney, Agent, or Firm* — Plumsea Law Group, LLC (57) ABSTRACT

An embodiment of the present invention provides a system and method for creating an electronic marketplace, utilizing an electronic non-currency unit of exchange, that provides for and facilitates the cost effective exchange of institutional research and trade order execution services between asset management firms and executing brokers in such manner as to substantially lower trading costs and improve investment performance on a recurring basis for the shareholders and beneficiaries investing in mutual funds and other investment portfolios.

26 Claims, 2 Drawing Sheets

SYSTEM AND METHOD FOR EXCHANGING INSTITUTIONAL RESEARCH AND TRADE ORDER EXECUTION SERVICES

This application is a continuation of U.S. patent application Ser. No. 12/043,687, filed Mar. 6, 2008, which claims the benefit of U.S. Provisional Application No. 60/905,812, filed Mar. 9, 2007, both of which are herein incorporated by reference in their entirety.

BACKGROUND

1. Field of the Invention

The present invention relates to a system and method for creating a marketplace providing for and facilitating the cost effective exchange of institutional research and trade order execution services between asset management firms and executing brokers.

2. Background of the Invention

Asset managers are paid an annual fee schedule based on assets in an investment portfolio, which involves determining which securities to hold in the investment portfolio and implementing related buy and sell trading decisions. An asset manager's fee for managing an investment portfolio may vary with the type of assets (such as equity or fixed income), the selected investment strategy, and the size of the investment portfolio, but an annual fee of 0.50% (fifty basis points or one-half of one percent) on equity assets is fairly common.

The trading of stocks and bonds by asset managers (money managers) in an investment portfolio is a complex process. The asset manager not only controls the selection of the stocks and bonds to buy and sell, but also controls where and, within regulatory requirements, how each trade order is executed.

There are currently two separate processes, and supporting marketplaces for associated goods and services, that support asset managers in executing their responsibilities in managing investment portfolios. The first process involves the asset manager's directing trade orders to an executing broker. An asset manager establishes a relationship with a plurality of executing brokers to execute trade orders at a specific number of cents per share (which varies by the type of trade). The second process involves the asset manager's accessing and reviewing institutional research, which is created by an executing broker or independent research provider. The asset managers often desire such research for guidance in making their investment decisions. A research report will usually have a specific cost, usually in the thousands of dollars (which varies according to a number of factors associated with each report).

In practice, the asset manager will often agree to pay the cost of research by adding a cost increment to each share traded until such additional cost accrued over the volume of shares traded equals the stated cost of the desired research. Such additional costs added to the per share execution costs for the cost of research are referred to as "soft dollars." For example, a trade may incur a penny per share execution cost ($0.01 per share) and have three cents per share ($0.03 per share) added on as a "soft dollar" cost, for a total execution cost of four cents ($0.04) per share. A research report may cost $7,500 and thus require that 250,000 shares be traded through the executing broker at four cents per share ($0.04) in order to pay the dollar cost of the desired research report (i.e., 250,000 shares×$0.03 per share=$7,500). Very importantly, the "soft dollar" costs are not paid for by the asset manager, but are passed through to the shareholders or beneficiaries in the mutual funds or investment portfolios managed by that asset manager.

Figure 1:
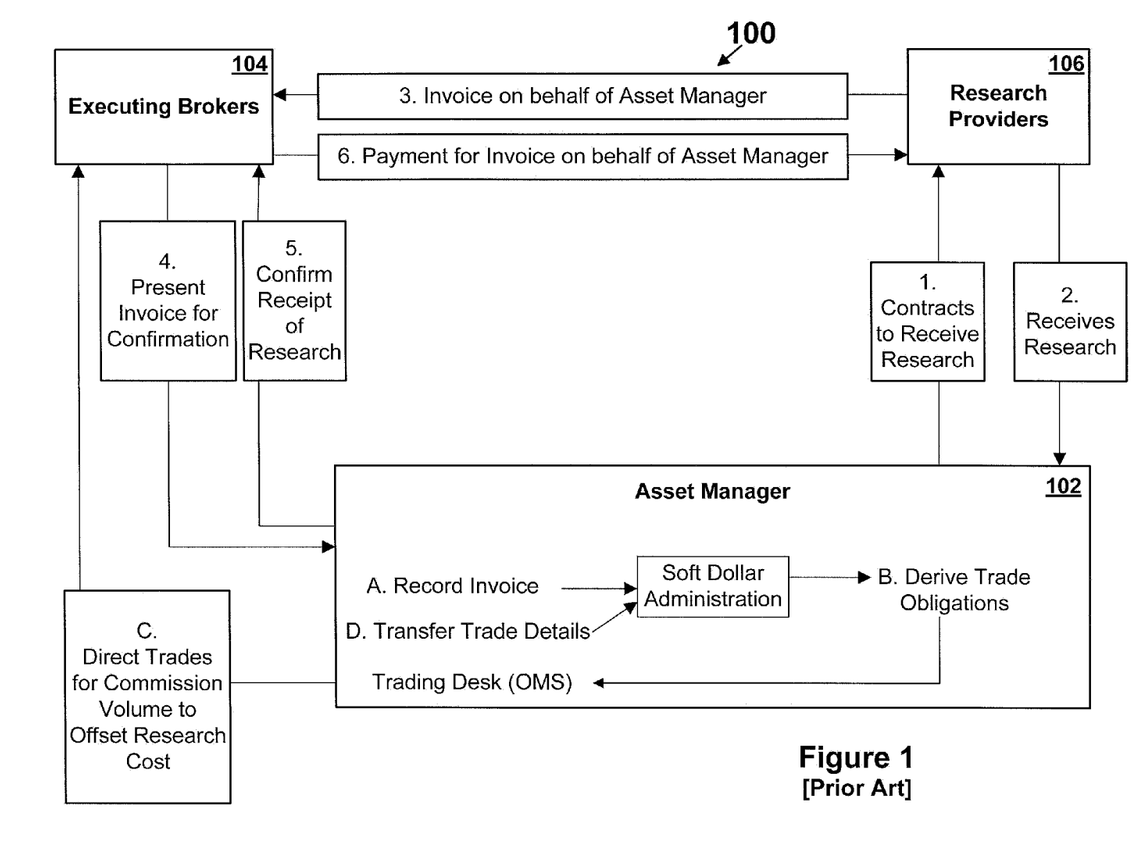
FIG. 1 is a schematic diagram illustrating a conventional process for trading by asset managers, which utilizes "soft dollars."

Referring to FIG. 1, an asset manager 102 (such as mutual fund companies or institutional asset management firms) usually maintains relationships with a plurality of executing brokers 104 (including, for example, broker-dealers (e.g., Merrill Lynch™, Morgan Stanley™, or UBS Paine Webber™), market makers (e.g., Knight Capital™ or Schwab Capital Markets™), exchanges (e.g., the New York Stock Exchange™ or NASDAQ™), electronic communication networks (ECNs) (e.g., INET™ or TRACT™), direct market access (DMA) vendors (e.g., Lava Trading™, Sonic™, or UNX™) and dark pools or crossing networks (e.g., LiquidNet™ or Pipeline™)). These executing brokers 104 are often selected based on the additional goods and services (such as research) they can provide to an asset manager 102.

The cost of these additional goods and services (such as research, data feeds, and software) is added over and above the trade's cost of execution and results in a higher total trade cost than what would otherwise be incurred by the fund or investment portfolio. The "soft dollar" costs for these additional services utilized by an asset manager 102 are passed through as revenues to various research providers 106 for their research, systems, software, data feeds, etc. and are paid for by the shareholders or beneficiaries through higher brokerage (trading) expenses and the resulting lower returns (lower performance) of their funds or accounts. These trades are usually executed at an average cost of 2.50 cents to 5.00 cents per share. In FIG. 1, the executing broker 104 and research provider 106 are shown as separate entities. In practice, however, the executing broker and research provider services are often through a single entity (such as Merrill Lynch™)

FIG. 1 provides an overview of the process whereby the asset manager 102 agrees to add "soft dollar" costs to the brokerage (trading) costs of an investment portfolio in order to pay for institutional research desired by an asset manager 102.

Asset manager 102, in step 1, contracts with research providers 106 in order to receive research.

The research provider 106, in step 2, delivers the research to the asset manager 102.

The research provider, in step 3, presents an invoice for "soft dollars" to an executing broker 104 for the research provided to the asset manager 102.

The executing broker 104, in step 4, presents the invoice for research to the asset manager 102 for their review and confirmation.

The asset manager 102, once the invoice is approved, (A) records the invoice, (B) derives the trade obligations to pay the "soft dollars," and, through the trading desk and order management system, (C) directs the trade orders to the specified executing broker 104 for commission volume to offset the cost of the research. The asset manager 102 (D) transfers the trade details to the soft dollar administration system to track the plurality of research requests and the resulting "soft dollars" paid to research providers.

Once the asset manager 102 confirms the trade did occur and the "soft dollars" are properly accounted, the asset manager 102, in step 5, confirms receipt of the research and payment of "soft dollars" to the executing broker 104.

The executing broker 104, in step 6, pays the invoice for research as presented in step 3, to the research provider 106 on behalf of the asset manager 102.

The utilization of "soft dollars," as illustrated in FIG. 1, is a long-standing industry practice. It is interesting to note, however, that these additional trading costs are not included, for example, in the operating expenses of a mutual fund (such as a quoted 1.10% annual operating expense) that are disclosed in a fund's prospectus (required disclosure document). As such, a fund's trades are often directed to executing brokers 104 so as to shift the cost of external research from the mutual fund company or institutional asset manager 102 to the investment portfolio and its shareholders or beneficiaries. Finally, asset management contracts usually contain a clause that eliminates any requirement that "soft dollar" costs incurred by a specific investment portfolio (and its shareholders or beneficiaries) benefit the investment portfolio responsible for paying the additional "soft dollar" costs. As such, an investment portfolio may pay additional costs for services that do not benefit the underlying shareholders or beneficiaries paying the additional "soft dollar" expense.

In fact, most shareholders in mutual funds are not aware that a fund's trading costs are in addition to the fund's annual operating expense (as disclosed in the prospectus) and, as such, serve to lower the investment performance (rate of return) of their funds. These same fund shareholders are also usually not aware that asset managers 102 are using the assets of the fund to pay additional "soft dollar" costs for trades in their mutual funds as a vaguely disclosed and unaccountable pool of cash to offset the asset manager's internal research and operating expenses in order to increase their corporate profits.

Overall, the current process of using "soft dollars" by asset managers to direct trades in order to generate "soft dollar" revenue is overly complex and expensive to shareholders and beneficiaries in terms of the lower performance in the investment portfolios. The current process for utilizing "soft dollars" was established in 1975 when Congress enacted Section 28(e) to permit an asset manager to use client commissions to pay for brokerage and research services. The Securities and Exchange Commission (SEC) provided additional guidance in 1986 as to what constitutes eligible research, products, and services under Section 28(e). In July 2006, the SEC released an Interpretative Release that more clearly defined what constitutes eligible research, products, and services in an attempt, according to many press reports, to curb perceived abuses of "soft dollars" in trading by asset managers. Most recently, in May 2007, SEC Chairman Cox sent a letter to both houses of Congress urging Congress "to consider legislation that repeals or substantially revises Section 28(e) . . . which provides a 'safe harbor for certain 'soft dollar' arrangements.'"

BRIEF SUMMARY OF THE INVENTION

An embodiment of the present invention provides a system (e.g., a hosted application) and method (e.g., organization of activity) for creating an electronic marketplace providing for and facilitating a cost effective process for: (1) the review, selection, distribution, pricing, tracking, and proper compensation by asset management firms and executing brokers related to research utilized by the asset management firms in their decision-making process for investment portfolios; (2) the review, selection, distribution, pricing, tracking and proper payment by asset management firms and executing brokers related to trade order execution services provided by executing brokers (as increased order flow generates increased revenues for executing brokers); (3) the allocation and tracking of account balances for research exchange units (a non-currency unit of exchange) provided by executing brokers to asset managers across a plurality of security and trade categories; and (4) facilitating the electronic exchange of goods (research reports and associated content such as conference calls, web casts, videotaped interviews, MP3 files, on-site visits, personal interviews, pod casts, virtual meetings, RSS feeds, and direct server to server messaging) and services (trade order execution services for trade order flow) through an electronic marketplace utilizing a non-currency unit of exchange that enables the prompt, efficient, and cost effective exchange and delivery of research reports and trade execution services among the provider and consumer of both goods and services.

This system and method are applicable to a wide variety of investment management firms including mutual fund companies, institutional investment managers, hedge funds, pension plans, trusts and endowment and other similar organizations that operate investment portfolios.

Overall, the system of present invention provides a real-time electronic marketplace combining the exchange of goods (research reports and associated content) and services (execution of trade orders). These are two independent sources of market activity, that is, activities that require their own marketplace for buyers and sellers to meet for purposes of negotiating and pricing exchanges. The first primary activity requiring a marketplace is for the provision of institutional research (such as a specific dollar cost per report) from executing brokers to asset managers. The second primary activity is the execution of trade orders (at a specific cents per share cost) sent by asset managers to executing brokers.

The present invention provides a system and method for creating a marketplace that combines the activities of these two separate marketplaces into a single electronic marketplace, utilizing a single non-currency unit of exchange, to facilitate the exchange of goods (research reports and associated content) and services (execution of trade orders) in a real-time process. This single real-time electronic marketplace provides mechanisms for the real-time pricing of research (enabling instantaneous updating for new products, volume discounts, sales promotions, and other similar sales practices) along with real-time pricing of trade order execution services (also enabling instantaneous updating for new products, services, and other similar practices). The real-time pricing and usage of research exchange units, an electronic non-currency unit of exchange, enables the system and method of the present invention to facilitate the real-time pricing and exchange of these goods (research reports and associated content) and services (trade order executions) in a manner that heretofore has not existed in the prior art.

The system of the present invention provides a research exchange unit pricing system for executing brokers to: (1) assign the execution costs (in cents per share, basis points or other such acceptable mechanism) for a variety of trades across a plurality of different share volumes, security types and individual securities; (2) establish the research exchange unit requirement, per research report or plurality of reports (and associated content), for accessing a wide variety of research; and (3) assign the research exchange units earned by an asset manager for directing a wide variety of trades (in different securities, share amounts, profitability, and desirability). The research exchange unit accounting system of the system of the present invention determines, calculates, accrues, allocates, and tracks research exchange units earned and used by asset management firms that direct trades to executing brokers. The research exchange units, as accrued by asset managers, are utilized (redeemed) to access research reports from executing brokers.

The asset manager directing trade orders to an executing broker accrues research exchange units from that executing broker on a real-time or delayed basis (as to protect the anonymity of the asset manager directing the trade order).

The asset manager accesses the research query and ordering system of the present invention to review and order research reports from an executing broker in exchange for a predetermined number of the asset manager's research exchange units with the executing broker. The research exchange unit accounting system of the present invention calculates, allocates, tracks, and reports on the research exchange units (by surplus or deficit) accrued by each asset manager with each executing broker and also tracks the corresponding research exchange units allocated by each executing broker to each asset manager. Finally, the research cost effectiveness analytics system of the present invention analyzes and compiles the metrics on the efficiency and effectiveness of the asset manager's trade execution and research acquisition efforts.

The system and method of the present invention eliminates, through the use of research exchange units, the use of "soft dollars," that is, the expense of executing a trade that is over and above the cost of executing a trade (such as 3 cents per share) and is used by the asset manager to pay for a wide variety of goods and services. As such, the shareholder and beneficiaries of the investment portfolios benefit from lower trading costs that are passed through to the fund shareholders or beneficiaries through improved performance of their investment portfolios.

An embodiment of the present invention provides a method for facilitating exchange of institutional research and trade order execution services between an asset manager and a broker, in which the method includes tracking orders executed by the broker on behalf of the asset manager; crediting the asset manager with research exchange units based on the executed orders and tracking the asset manager's total research exchange units with the broker; receiving from the broker a research item produced by the broker; storing the research item; receiving from the broker a research exchange unit value for the research item; receiving a selection by the asset manager of the research item; and delivering the research item to the asset manager and subtracting from the asset manager's total research exchange units an amount of research exchange units equal to the research exchange unit value of the delivered research item.

DETAILED DESCRIPTION OF THE INVENTION

Figure 2:
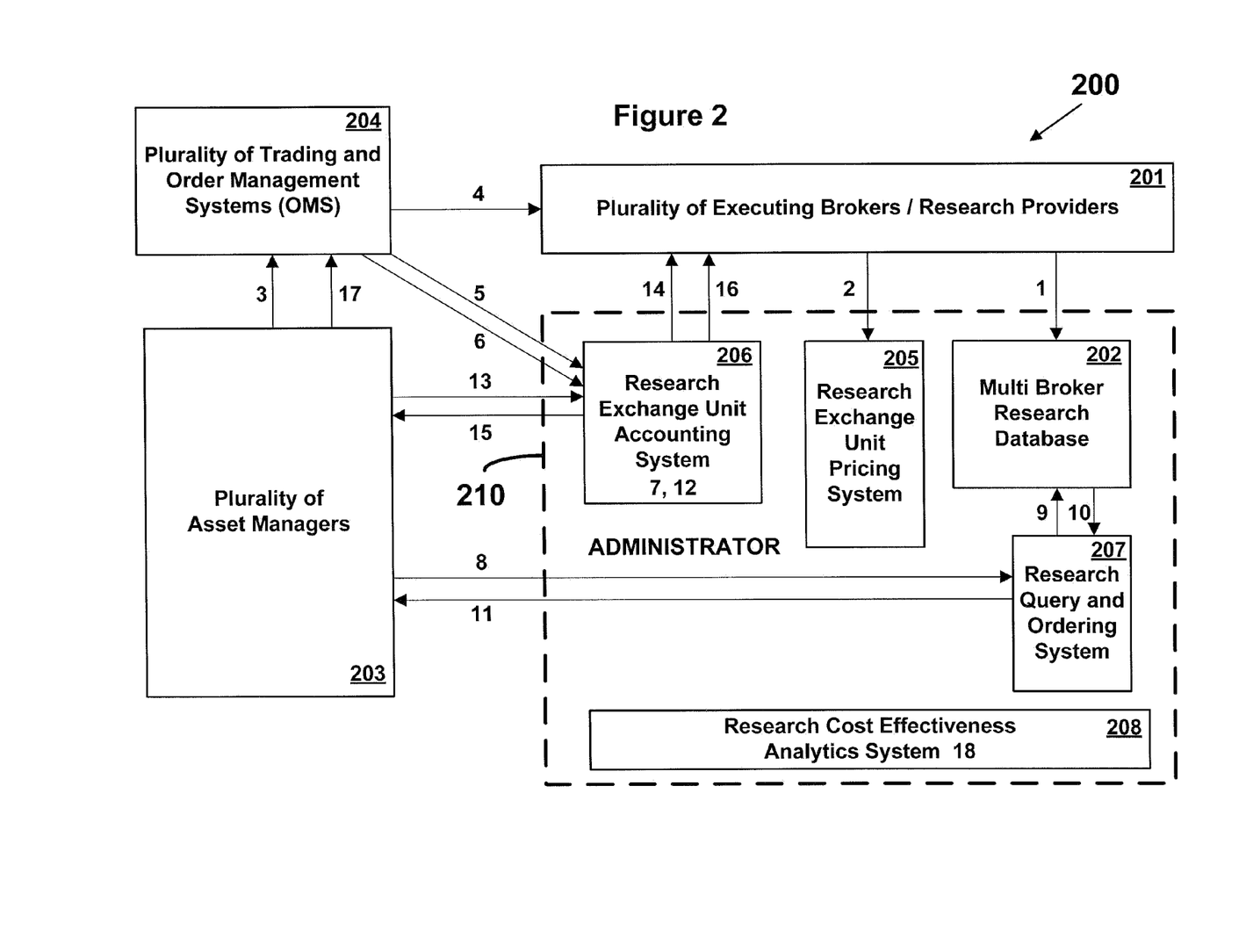
FIG. 2 is a schematic diagram illustrating an exemplary system and method of the present invention creating a marketplace, utilizing research exchange units (an electronic non-currency unit of exchange), that provides for and facilitates the cost effective exchange of institutional research and trade order execution services between asset management firms and executing brokers, according to an embodiment of the present invention.

FIG. 2 illustrates a system and method for exchanging institutional research and trade order execution services, according to an embodiment of the present invention. As shown in the exemplary system and method 200, each broker of a plurality of executing brokers/research providers 201 posts research on the multi-broker research database 202, which is preferably a secure site. The executing brokers 201 update the research exchange unit pricing system 205 as to the costs for executing trade orders across a plurality of securities and trade categories. The executing brokers 201 also update the research exchange unit pricing system 205 for the research exchange unit requirements for asset managers to access their various research reports (and associated content). The executing brokers 201 can also update the research exchange unit accounting system 206 as to the research exchange units accrued by asset managers for various types of trades in various securities. Or, alternatively, the research exchange unit accounting system 206 can be automatically updated (e.g., from an automatic data feed) by the plurality of trading and order management systems 204.

A plurality of asset managers 203 directs trades to a selected executing broker 201 through the plurality of trading and order management systems 204. The order management system 204 updates the research exchange unit accounting system 206 as to the order from the asset manager. The research exchange unit accounting system 206 determines and allocates the appropriate research exchange unit amount to the specific trade according to the executing broker's 201 instructions on the research exchange unit pricing system 205. The plurality of asset managers 203 accesses the research query and ordering system 207 to review, select, and download a plurality of research reports posted on the multi-broker research report database 202 from a plurality of executing brokers 201.

The research exchange unit accounting system 206 tracks all research exchange units accrued by each asset manager 203 based on the trading activity with each executing broker 201. Likewise, the research exchange unit accounting system 206 also tracks each executing broker 201 based on the research exchange units accrued by each asset manager 203 and the research exchange units generated by their trading activity and utilized to order research reports (and associated content) from the executing broker 201. An asset manager's 203 research exchange unit account may be in a surplus or deficit at any point in time with a given executing broker 201.

As shown in FIG. 2, an exemplary system of the present invention provides actors comprising asset managers, executing brokers/research providers, a plurality of trading and order management systems, and an administrator 210 of the multi-broker research database 202, research exchange unit pricing system 205, research exchange unit accounting system 206, research query and ordering system 207 and the research cost effectiveness analytics system 208. The asset managers enter trade orders and access research. The executing brokers, to whom the buy or sell order is directed to be executed (filled) at a stated price, post research reports, determine the research exchange unit requirement for each of their research reports, and also determine the research exchange units allocated to the asset manager for each order directed to them for execution.

As shown in FIG. 2, the system of the present invention 200 can include a number of networked computer sub systems providing real-time connectivity and updating to the other sub systems on the network. These sub systems include, for example, the multi-broker research database 202, the research exchange unit pricing system 205, the research exchange unit accounting system 206, the research query and ordering system 207, and the research cost effectiveness analytics system 208, embodiments of which are further described below.

The multi-broker research database 202 is a computer-based graphical user interface (GUI) and associated software program(s) and databases that provide a secure holding area for the research that executing brokers/research providers make available to asset managers. Preferably, each executing broker can post and/or remove only those reports (and associated content) that belong to their organization (unless special co-marketing arrangements are made with other research providers). Also preferably, research can be accessed by asset managers only through the research query and ordering system 207.

The research exchange unit pricing system 205 is a graphical user interface (GUI) and associated software program(s) that enable executing brokers to provide the parameters that are utilized to determine: (1) the execution costs for trade orders across a plurality of securities and trade categories; (2) the research exchange unit requirements for a plurality of research reports (and associated content); and (3) the research exchange units accrued by an asset manager for each trade order directed to an executing broker. Research exchange units are assigned by the executing broker for each security that they trade according to a number of factors, such as the number of shares in an order, the spread on the security, whether or not the executing broker makes a market in the security, whether or not the order requires special handling by a broker or algorithm, and if the order requires a pass through to another executing broker. An executing broker will provide greater research exchange units for orders in more profitable types of trades as well as fewer research exchange units for orders in less profitable types of trades. The research exchange unit pricing system utilizes these factors to determine the research exchange units accrued by the asset manager for each order executed in a given security by a given executing broker.

The research exchange unit accounting system 206 is a computerized processing system (or, processor) with a graphical user interface (GUI) and associated software program(s) that tracks the share volume executed by each asset manager with each executing broker and provides each asset manager with their updated available research exchange units with each executing broker. The research exchange unit accounting system can notify each asset manager of the specific research they have utilized, the research exchange unit requirement for the specific research, and the updated research exchange unit balance (surplus or deficit) with the executing broker. The research exchange unit accounting system can also post and distribute statements periodically (e.g., monthly or quarterly) to each asset manager of their research activity and current research exchange unit balance with each executing broker. The research exchange unit accounting system can notify each executing broker of each asset manager accessing their research and their volume of shares traded, the research exchange unit requirement for the specific research, and the updated research exchange unit balance (the corresponding surplus or deficit) of each asset manager with that executing broker. The research exchange unit accounting system can also post and distribute statements periodically (e.g., monthly or quarterly) to each executing broker of the activity by, and the research exchange unit balance with, each asset manager that directs trades and/or accesses research.

The research exchange unit accounting system 206 can include, or be in communication with, a financial record database storing financial data records that are associated with transactions between the plurality of asset managers and the plurality of executing brokers. The financial data records can include data associated with, for example, trades, orders, research exchange units, and research items. Administrator 210 can include, either as part of research exchange unit accounting system 206 or elsewhere, a database manager that creates, changes, and deletes the financial data records of the financial record database based on the transactions between the plurality of asset managers and the plurality of executing brokers. The database manager can include, for example, a queue for receiving instructions from the research exchange unit accounting system 206 for processing, wherein the instructions when processed result in adding, changing, or deleting to at least one financial data record. The research exchange unit accounting system 206 can be programmed to receive input reflecting orders executed by the plurality of brokers on behalf of the plurality of asset managers, issue instructions to alter one or more financial data records in the financial record database to credit the plurality of asset managers with research exchange units based on the executed orders, and issue instructions for management of financial data records reflecting each asset manager's total research exchange units with each of the brokers.

The research exchange unit accounting system 206 can also track direct cash payments from an asset manager to an executing broker. Such payments can be wired into a central repository in the research exchange unit accounting system 206 whereby all cash payments are properly tracked, credited, and dispersed with respect to the originating asset manager and receiving executing broker. Upon such receipt and dispersal of cash payment, the research exchange unit accounting system 206 properly updates the research exchange unit balance (surplus or deficit) of the asset manager with the executing broker. In one embodiment, the research exchange unit accounting system 206 receives a cash payment from an asset manager for a research item produced by a broker, credits the asset manager with research exchange units based on the cash payment, receives from the broker a research exchange unit value for the cash-purchase research item, delivers the research item to the asset manager, subtracts from the asset manager's total research exchange units with the broker an amount of research exchange units equal to the research exchange unit value of the research item, and forwards the cash payment to the broker.

The research query and ordering system 207 is a computerized processing system with a graphical user interface (GUI) and associated software program(s) enabling an asset manager to search and access, among other things, the report titles, name(s) of analyst(s), date of publication, and abstract of the research posted by executing brokers on the multi-broker research system. Research can be sorted by various subjects such as executing broker, subject, company, country, industry, SIC code, analyst(s), economic trends, international subjects, and other categories. Asset managers can select a report or a plurality of reports (and/or associated content) for review. The asset manager utilizes their research exchange units with the executing broker providing the research and allots the required number of research exchange units from their research exchange unit account in exchange for the research from the executing broker.

The research cost effectiveness analytics system 208 is a computerized processing system with a graphical user interface (GUI) and associated software program(s) that analyzes, compiles and reports on order execution costs and research requests for determining total effectiveness of an asset manager's research acquisition efforts and rates the cost effectiveness (in total and average execution costs for research) for each asset manager relative to other asset managers utilizing the system.

Overall, the sub systems of the present invention work in a secure and private network enabling each of the sub systems to communicate and transmit data with each other sub system and authorized external users while security that ensures that the system of the present invention is unavailable to unauthorized users.

In an embodiment of the present invention, the following systems, services, and data are preferably in place for an asset manager and executi Security master data service.ng broker:
Trading and order management system.
Real-time quote service.
Best execution monitoring service.
Transaction cost accounting system.
Connectivity among the asset managers 203, trading and order management systems 204, executing brokers 201, and administrator 210.

With continuing reference to FIG. 2, an exemplary process of the present invention is described below.

In step 1, each broker of a plurality of executing brokers 201 post its research reports on the multi-broker research database 202.

In step 2, each executing broker 201 updates the research exchange unit pricing system 205. For example, a broker provides the parameters to determine: (1) the execution costs for trade orders across a plurality of securities and trade categories; and (2) the research exchange unit requirements for a plurality of research. The research exchange units are accrued by an asset manager for each trade order directed to an executing broker. Research exchange units are assigned by the executing broker for each security that they trade according to a number of factors, such as the number of shares in an order, the spread on the security, whether or not the executing broker makes a market in the security, whether or not the order requires special handling by a broker or algorithm, and if the order requires a pass through to another executing broker. The executing broker utilizes these factors to determine the research exchange units accrued by the asset manager for each order executed in a given security.

In step 3, from among the plurality of asset managers 203, an asset manager enters a buy or sell order and sends the order to a trading and order management system 204.

In step 4, the trading and order management system 204 directs the asset manager's order to the executing broker 201 specified by the asset manager 203.

In step 5, the trading and order management system 204 updates the research exchange unit accounting system 206 as to the order placed by the asset manager 203 with the executing broker 201.

In step 6, the trading and order management system 204 updates the research exchange unit accounting system 206 to confirm execution (e.g., a single fill or multiple fills) of the order by the executing order on behalf of the asset manager 203. An executing broker may receive an order and not be able to execute (fill) the order, or regulatory requirements (such as SEC Rule NMS) may mandate that part or all of the order be sent to an execution venue offering a better price. In these situations, the executing broker may still earn revenue from the "pass through" of the order to another execution source. As such, the asset manager submitting the order may earn some increment of research exchange unit from the executing broker who originally received the order.

In step 7, the research exchange unit accounting system 206 accrues research exchange units by asset manager for each trade order directed by an asset manager to an executing broker.

In step 8, the asset manager 203 accesses the report query and ordering system 207 to query and order research posted by a plurality of executing brokers 201. Research can be sorted by various subjects such as executing broker, subject, company, country, industry, SIC code, analyst, economic trends, international subjects, and other categories.

In step 9, the report query and order system 207 orders the research selected by the asset manager 203 from the research database 202.

In step 10, the multi-broker research database 202 delivers the selected research to the report query and ordering system 207.

In step 11, the report query and ordering system 207 delivers the selected research to the asset manager 203 that ordered the specific research.

As generally represented by step 12, the research exchange unit accounting system 206 is an accounting system for research exchange units that:

a) determines the number of shares traded by an asset manager 203 through an executing broker 201; and b) calculates the research exchange units for the shares traded on behalf of each asset manager 203 according to the criteria posted on the research exchange unit pricing system 205 by each executing broker 201 (and reflecting data on executed trades from the trading and order management systems 204);

c) assigns research exchange units to each asset manager 203 for shares traded for each order executed by each executing broker 201;

d) debits the asset manager's 203 research exchange unit balance with each executing broker 201 by the research exchange unit requirement (per the research exchange unit pricing system 205) for the research report(s) ordered from an executing broker 201;

e) updates each asset manager's 203 research exchange unit account balance (surplus or deficit) to the new total with each executing broker 201;

f) updates each executing broker's 201 research exchange unit account (the corresponding surplus or deficit) with each asset manager 203; and g) tracks research purchased for cash payment, processes bills and payments for those purchases, and updates accounts to reflect those purchases.

In step 13, an asset manager 203 can make direct cash payment for research through the research exchange unit accounting system 206.

In step 14, the research exchange unit accounting system 206 updates its records for research exchange unit values and passes the cash payment from the asset manager 203 through to the appropriate executing broker 201.

In step 15, the research exchange unit accounting system 206 notifies each asset manager 203 of the accessed research, the research exchange unit requirement for the specific research and the updated research exchange unit balance (surplus or deficit) with the executing broker 201. The research exchange unit accounting system 206 also posts and distributes statements to each asset manager 203 of their research activity and current research exchange unit balance with each executing broker 201.

In step 16, the research exchange unit accounting system 206 notifies each executing broker 201 of each asset manager 203 accessing their research, the research exchange unit requirement for the specific research, and the updated research exchange unit balance (the corresponding surplus or deficit) of each asset manager 203 with that executing broker 201. The research exchange unit accounting system 206 also posts and distributes statements to each executing broker 201 of the activity by, and the research exchange unit balance with, each asset manager 203 that directs trades and/or access research to that executing broker 201.

In an aspect of the present invention, steps 5-7 occur automatically as a data feed from the plurality of trading and order managements systems 204 to research exchange unit accounting system 206. In a further aspect, administrator includes a financial records database that stores financial data records and a database manager that creates, changes, and deletes financial data records in the financial records database. The database manager can include, for example, a queue for receiving instructions from the research exchange unit accounting system 206 for processing, wherein the instructions when processed result in adding, changing, or deleting to at least one financial data record. The research exchange unit accounting system 206 can be programmed to receive input reflecting orders executed by the plurality of brokers on behalf of the plurality of asset managers, issue instructions to alter one or more financial data records in the financial record database to credit the plurality of asset managers with research exchange units based on the executed orders, and issue instructions for management of financial data records reflecting each asset manager's total research exchange units with each of the brokers.

Referring again to FIG. 2, in step 17, the plurality of asset managers 203 enters additional buy and sell orders and send orders to a trading and order management system 204 for accruing additional research exchange units for obtaining research reports from a plurality of executing brokers 201.

In step 18, the research cost effectiveness analytics system 208 analyzes and compiles order execution costs and research requests for determining total effectiveness of an asset manager's research acquisition efforts and rates the cost effectiveness (in total and average execution costs for research) for each asset manager relative to other asset managers utilizing the system of the present invention. This analysis can include cumulative statistics such as: total number of shares executed and the associated dollar cost; total research exchange unit earned by trading and allocated to research; total number of research reports and associated dollar value; average shares executed per research report; and average dollar cost of research reports. An asset manager is also provided with a breakdown and ranking of the above statistics by the executing broker. Also, research providers not offering trade order execution services are able to align with an executing broker to offer research as part of the executing broker's research offerings. This arrangement enables the smaller, high quality research providers to distribute their research through a distribution and revenue sharing arrangement with an executing broker. The executing broker benefits by attracting even greater order flow as a result of their arrangement with small, high quality research providers.

An alternative embodiment of the present invention provides an exemplary method for facilitating a cost effective delivery of institutional research to asset management firms, in which the method includes:
providing a system for use by an individual or plurality of executing brokers to post their research and for use by an individual or plurality of executing brokers to: (1) assign the execution costs for each trade in a security that an asset manager directs to an executing broker; (2) assign research exchange units accrued by each trade in a security an asset manager directs to an executing broker; and (3) establish the research exchange unit requirement per research or for a plurality of research;
communicating, from a plurality of asset managers, a buy or sell order from an asset manager and sending the order to a trading and order management system;
communicating, through the trading and order management system accessed by the asset manager, the asset manager's order to the executing broker specified by the asset manager;
updating, by the trading and order management system, the system as to the order placed by the asset manager with the executing broker;
confirming, through the trading and order management system, the execution (fill) of the order in the system on behalf of the asset manager;
calculating, through the system, the research exchange units earned by the trade order;
allocating, through the system, the research exchange units to the asset manager originating the trade order;
accessing, by the asset manager, the system to query and order research or a plurality of research posted by an individual or plurality of executing brokers;
ordering, by the asset manager, an individual and/or plurality of research by the asset manager, through the system from the research posted by an individual or plurality of executing brokers;
delivering, through the system, the selected research to the asset manager;
updating, through the system, the calculated research exchange units for the shares traded on behalf of each asset manager according to the criteria posted on the research exchange unit pricing system by each executing broker (and reflecting data on executed trades received from the trading and order management systems);
debiting, through the system, the research exchange unit requirement for research or plurality of research from an asset manager's research exchange unit balance with the executing broker providing the report;
updating, through the system, each asset manager's research exchange unit account balance (surplus or deficit) to the new total with each executing broker;
updating, through the system, each executing broker's research exchange unit account (the corresponding surplus or deficit) with each asset manager;
tracking, billing, and updating, through the system, for research purchased by asset managers for cash payment;
reporting, through the system, to each asset manager of the accessed research, the research exchange unit requirement for the specific research and the updated research exchange unit balance (surplus or deficit) with the executing broker;
reporting, through the system, to each executing broker of each asset manager accessing their research, the research exchange unit requirement for the specific research and the updated research exchange unit balance (the corresponding surplus or deficit) of each asset manager;
compiling and analyzing, through the system, the asset manager's order execution costs and research requests for determining total effectiveness of an asset manager's research acquisition efforts and rating the cost effectiveness (in total and average execution costs for research) for each asset manager relative to a plurality of asset managers utilizing the system.

Overall, the present invention provides a method and system that creates a marketplace, utilizing an electronic non-currency unit of exchange, that facilitates the cost effective exchange of institutional research and trade order execution services between asset management firms and executing brokers, while eliminating "soft dollar" expenditures from the trade execution costs. The result of the present invention is a substantial, quantifiable, and compounding cost savings, and the resulting improved investment performance to fund shareholders and plan beneficiaries. The present invention provides a highly desirable social utility of considerable, recurring, and compounding shareholder and plan beneficiary savings. Indeed, a reasonably effective implementation of the embodiment of the present invention could easily benefit millions of Americans through substantially improved performance of their investment portfolios.

In an aspect of the present invention, a tangible output of the system or method of the present invention can include, for example, delivery of a research item to an asset manager and delivery of statements, either in paper form or electronically, to asset managers and brokers indicating their respective account statuses. The asset manager statements can include, for example, the total research exchange units accrued for each broker, pending selections of research items that have not yet been delivered, research items that have been delivered, and account activity summaries detailing each transaction. The broker statements can include, for example, the total research exchange units accrued for each asset manager that the broker services, the research items that the broker has posted, the research items that have been delivered, the asset managers to which the research items have been delivered, the research exchange unit value assigned to each research item, and account activity summaries detailing each transaction. Thus, the system and method (as implemented through technology) described herein produce these and other tangible results.

The system of the present invention can include one or more computer systems, as represented in FIG. 2. A computer system can include individual components such as a central processor, memory, input and output devices, fixed code storage, and removable code storage. The individual components can be interconnected by a system bus. The system can further include a database, stored in computer readable form, containing entries related to, for example, research items, research exchange unit values, accrued research exchange units, and trade execution information (e.g., orders).

In accordance with an embodiment of the present invention, instructions adapted to be executed by a processor to perform a method are stored on a computer-readable medium. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

In the context of this document, a "computer-readable medium" can be any means that can contain, store, communicate, propagate, or transport the program for use by or in connection with the instruction execution system, apparatus, or device. The computer readable medium can be, for example, but is not limited to, an electronic, magnetic, optical, electromagnetic, infrared, or semi-conductor system, apparatus, device, or propagation medium. More specific examples (a non-exhaustive list) of computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for facilitating exchange of institutional research and trade order execution services between an asset manager and a broker, the method comprising:
    tracking, using a research exchange unit accounting computer processor, trade orders executed by the broker on behalf of the asset manager;
    crediting the asset manager with an amount of research exchange units corresponding to a value to the broker of the trade orders executed by the broker on behalf of the asset manager and tracking the asset manager's total research exchange units with the broker, wherein the total research exchange units are redeemable by the asset manager for research items of the broker;
    receiving a research item of the broker;
    storing the research item;
    receiving a research exchange unit value for the research item;
    receiving a selection by the asset manager of the research item; and
    delivering the research item to the asset manager and subtracting from the asset manager's total research exchange units an amount of research exchange units equal to the research exchange unit value for the selected research item.

2. The method of claim 1, further comprising receiving from the broker instructions for determining the amount of research exchange units corresponding to the value of the trade orders and crediting the asset manager with the amount of research exchange units based on the instructions.

3. The method of claim 2, wherein the instructions comprise crediting a higher amount of research exchange units for trade orders that are more profitable to the broker and crediting a lower amount of research exchange units for trade orders that are less profitable to the broker.

4. The method of claim 2, wherein the instructions comprise separate instructions for each security traded by the broker.

5. The method of claim 1, further comprising determining the value to the broker of the executed trade orders based on at least one of the number of shares in a trade order, the spread on a security of a trade order, whether or not the executing broker makes a market in a security of a trade order, whether or not a trade order requires special handling by a broker or algorithm, and whether or not a trade order requires a pass through to another executing broker.

6. The method of claim 1, further comprising determining the value to the broker of the executed trade orders based on the number of shares in a trade order.

7. The method of claim 1, further comprising determining the value to the broker of the executed trade orders based on profitability of a trade order.

8. The method of claim 1, wherein each research exchange unit comprises an electronic non-currency unit of exchange that is accrued for trade order execution and redeemable for research.

9. The method of claim 1, wherein the research item is delivered to the asset manager after the trade orders are executed by the broker on behalf of the asset manager and after the amount of research exchange units corresponding to the value to the broker of the trade orders executed by the broker on behalf of the asset manager are credited to the asset manager.

10. A method for facilitating exchange of institutional research and trade order execution services between a plurality of asset managers and a plurality of brokers, the method comprising:
tracking, using a research exchange unit accounting computer processor, trade orders executed by the plurality of brokers on behalf of the plurality of asset managers;
crediting each asset manager of the plurality of asset managers with an amount of research exchange units with each broker of the plurality of brokers corresponding to a value to the each broker of the trade orders executed by the each broker on behalf of the each asset manager and tracking each asset manager's total research exchange units with each of the brokers, wherein the total research exchange units for each broker are redeemable by the each asset manager for research items of the each broker;
receiving for each broker of the plurality of brokers a research item;
storing the research item of each broker;
receiving for each broker of the plurality of brokers a research exchange unit value for the research item of the each broker;
receiving selections by the plurality of asset managers of the stored research items; and
delivering, for each selection, the selected research item to the selecting asset manager and subtracting from the selecting asset manager's total research exchange units with the broker corresponding to the selected research item, an amount of research exchange units equal to the research exchange unit value of the selected research item.

11. The method of claim 10, wherein each of the research exchange units is associated with a particular broker and is redeemable for research items only of that particular broker.

12. The method of claim 10, further comprising receiving from each of the plurality of brokers different instructions for determining the amount of research exchange units corresponding to the value of the trade orders and crediting the asset manager with the amount of research exchange units based on the different instructions.

13. The method of claim 10, further comprising determining the value to the broker of the executed trade orders based on at least one of the number of shares in a trade order, the spread on a security of a trade order, whether or not the executing broker makes a market in a security of a trade order, whether or not a trade order requires special handling by a broker or algorithm, and whether or not a trade order requires a pass through to another executing broker.

14. The method of claim 10, wherein delivering the selected research item to the selected asset manager occurs after the broker corresponding to the selected research item has executed the trade orders on behalf of the selected asset manager.

15. A system for facilitating exchange of institutional research and trade order execution services between a plurality of asset managers and a plurality of brokers, the system comprising:
a research exchange unit accounting processor that
tracks trade orders executed by the plurality of brokers on behalf of the plurality of asset managers;
credits each asset manager of the plurality of asset managers with an amount of research exchange units with each broker of the plurality of brokers corresponding to a value to the each broker of the trade orders executed by the each broker on behalf of the each asset manager; and
tracks each asset manager's total research exchange units with each of the brokers, wherein the total research exchange units for each broker are redeemable by the each asset manager for research items of the each broker;
a research database that electronically receives and stores for each broker of the plurality of brokers a research item of the each broker;
a research exchange unit pricing processor that receives for each broker of the plurality of brokers a research exchange unit value for the research item of the each broker; and
a research query and order processor that
receives selections by the plurality of asset managers of the stored research items; and
delivers, for each selection, the selected research item to the selecting asset manager,
wherein, upon the each selection, the research exchange unit accounting processor subtracts from the selecting asset manager's total research exchange units with the broker corresponding to the selected research item, an amount of research exchange units equal to the research exchange unit value of the selected research item.

16. The system of claim 15, wherein the value to the each broker of the executed trade orders is based on at least one of the number of shares in a trade order, the spread on a security of a trade order, whether or not the executing broker makes a market in a security of a trade order, whether or not a trade order requires special handling by a broker or algorithm, and whether or not a trade order requires a pass through to another executing broker.

17. The system of claim 15, wherein the broker corresponding to the selected research item comprises a first broker, wherein the research query and order processor delivers the selected research item to the selecting asset manager after the research exchange unit accounting processor credits the selecting asset manager with an amount of research exchange units with the first broker corresponding to the value to the first broker of the trade orders executed by the first broker on behalf of the selecting asset manager.

18. A system for facilitating exchange of institutional research and trade order execution services between a plurality of asset managers and a plurality of brokers, the system comprising:
a research exchange unit accounting processor that is in communication with a financial record database storing financial data records;
a database manager for creating, changing, and deleting financial data records, the database manager including a queue for receiving instructions from the research exchange unit accounting processor for processing, wherein said instructions when processed result in adding, changing, or deleting to at least one financial data record, the research exchange unit accounting processor being programmed to receive input reflecting trade orders executed by the plurality of brokers on behalf of the plurality of asset managers, issue instructions to alter one or more financial data records in the financial record database to credit each asset manager of the plurality of asset managers with an amount of research exchange units with each broker of the plurality of brokers corresponding to a value to the each broker of the trade orders executed by the each broker on behalf of the each asset manager, and issue instructions for management of financial data records reflecting each asset manager's total research exchange units with each of the brokers, wherein the total research exchange units for each broker are redeemable by the each asset manager for research items of the each broker;

a research database that electronically receives and stores for each broker of the plurality of brokers a research item of the each broker;

a research exchange unit accounting pricing processor that receives for each broker of the plurality of brokers a research exchange unit value for the research item of the each broker; and a research query and order processor that receives selections by the plurality of asset managers of the stored research items; and delivers, for each selection, the selected research item to the selecting asset manager, wherein, upon the each selection, the research exchange unit accounting processor subtracts from the selecting asset manager's total research exchange units with the broker corresponding to the selected research item, an amount of research exchange units equal to the research exchange unit value of the selected research item.

19. The system of claim 18, wherein the value to the each broker of the executed trade orders is based on at least one of the number of shares in a trade order, the spread on a security of a trade order, whether or not the executing broker makes a market in a security of a trade order, whether or not a trade order requires special handling by a broker or algorithm, and whether or not a trade order requires a pass through to another executing broker.

20. The system of claim 18, wherein the selecting asset manager is credited with an amount of research exchange units before the selected research item is delivered to the selecting asset manager.

21. A method for facilitating exchange of institutional research and trade order execution services between a plurality of asset managers and a plurality of brokers, the method comprising:

tracking, using a research exchange unit accounting computer processor, trade orders executed by the plurality of brokers on behalf of the plurality of asset managers;

crediting each asset manager of the plurality of asset managers with research exchange units with each broker of the plurality of brokers based on the trade orders executed by the each broker on behalf of the each asset manager and tracking each asset manager's total research exchange units with each of the brokers, wherein the total research exchange units for each broker are redeemable by the each asset manager for research items of the each broker;

receiving for each broker of the plurality of brokers a research item;

storing the research item of each broker;

receiving for each broker of the plurality of brokers a research exchange unit value for the research item of the each broker;

receiving selections by the plurality of asset managers of the stored research items; and delivering, for each selection, the selected research item to the selecting asset manager and subtracting from the selecting asset manager's total research exchange units with the broker corresponding to the selected research item, an amount of research exchange units equal to the research exchange unit value of the selected research item;

compiling, for each asset manager, the each asset manager's trade order execution costs and research requests;

determining, based on the compiled trade order execution costs and research requests, total cost effectiveness of the each asset manager's research acquisition efforts; and rating the total cost effectiveness for the each asset manager relative to the plurality of asset managers.

22. The method of claim 21, further comprising rating the total cost effectiveness in total and average execution costs for research for the each asset manager relative to the plurality of asset managers.

23. The method of claim 21, further comprising reporting the rated total cost effectiveness to the each asset manager.

24. The method of claim 21, wherein determining the total cost effectiveness comprises determining at least one of a total number of shares executed and an associated dollar cost; a total research exchange unit earned by trading and allocated to research; a total number of research items and associated dollar value; an average shares executed per research item; and an average dollar cost of research items.

25. The method of claim 21, further comprising:

determining the total cost effectiveness by determining cumulative statistics comprising a total number of shares executed and an associated dollar cost, a total research exchange unit earned by trading and allocated to research, a total number of research items and associated dollar value, an average shares executed per research item, and an average dollar cost of research items; and reporting to the each asset manager a breakdown and ranking of the cumulative statistics by executing broker.

26. The method of claim 21, wherein the selecting asset manager accrues research exchange units before the selected research item is delivered to the selecting asset manager.

* * * * *